UNITED STATES PATENT OFFICE.

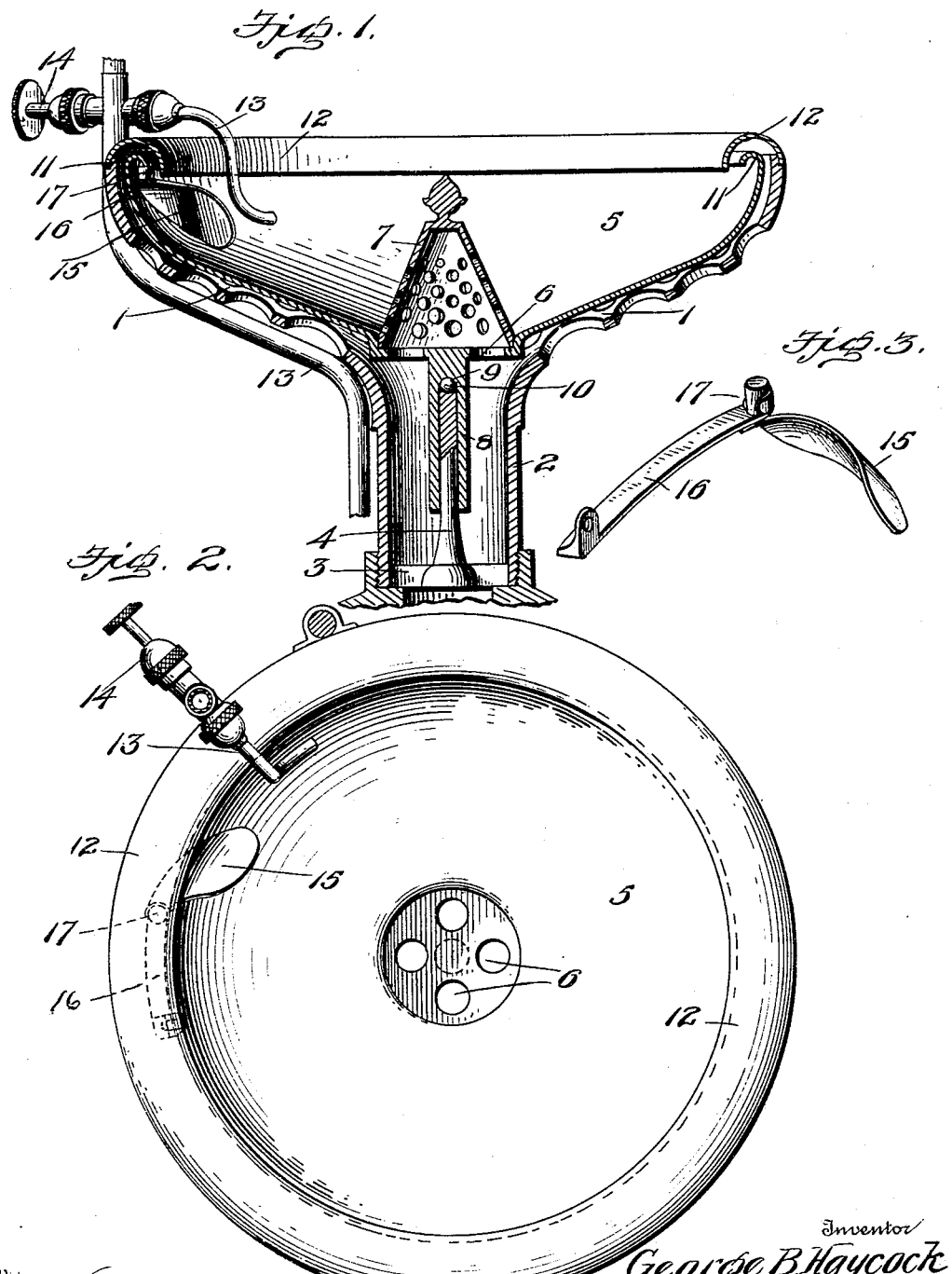

GEORGE B. HAYCOCK, OF CHICAGO, ILLINOIS.

FOUNTAIN-CUSPIDOR.

SPECIFICATION forming part of Letters Patent No. 664,857, dated January 1, 1901.

Application filed April 5, 1900. Serial No. 11,704. (No model.)

*To all whom it may concern:*

Be it known that I, GEORGE B. HAYCOCK, a citizen of the United States, residing at Chicago, in the county of Cook and State of Illinois, have invented certain new and useful Improvements in Fountain-Cuspidors; and I do declare the following to be a full, clear, and exact description of the invention, such as will enable others skilled in the art to which it appertains to make and use the same.

The invention relates to fountain-cuspidors, and more particularly to cuspidors of that class shown and described in Letters Patent No. 644,355, issued to me February 27, 1900.

Prior to the patent above referred to in the construction of fountain-cuspidors in which a jet of water is employed to rotate the bowl and keep the same clean it was found to be necessary to provide an inclosing supplemental or outer bowl to catch the water overflowing from the inner rotary bowl and lead it to the discharge-pipe, for otherwise the water would be thrown out of the inner rotary bowl by the centrifugal force due to the constantly increasing rapidity with which the bowl moved. In the patent above referred to no means were employed for catching the water which might be thrown out from the rapidly-rotating bowl; and the object of this present invention is to provide means whereby the use of an outer bowl may be dispensed with and the movement of the rotating bowl be regulated so as to prevent the water from being thrown out from the same.

With this object in view the invention consists in certain features of construction and combination of parts which will be hereinafter fully set forth.

In the accompanying drawings, Figure 1 is a vertical sectional view through my improved fountain-cuspidor. Fig. 2 is a top plan view, and Fig. 3 is a detail perspective view, of the improved governor for regulating the speed of the rotary bowl.

In the drawings the same reference characters indicate the same parts of the invention.

Referring to said drawings, 1 denotes a supporting-frame, which may consist of diverging arms, such as shown in my patent above referred to, or an open framework, such as is shown in the drawings. To the lower end of the supporting-frame is secured a discharge-pipe 2, which may be connected by a hose or other pipe to the sewer.

3 denotes a support consisting of cross-bars to form a spider, and 4 denotes a spindle projecting vertically from said support and provided with a concave upper end.

5 denotes a rotary bowl which is provided with a discharge-opening 6, covered by a removable strainer 7. The bowl is provided with a central bearing-sleeve 8, which embraces the spindle 4, and is formed with a concave bearing 9. A ball-bearing 10 is placed in the concave bearing of the sleeve of the spindle and is preferably of agate. The upper end of the bowl is provided with a downwardly-turned inwardly-projecting annular flange 11 and the upper end of the supporting-frame with an inwardly-projecting shield 12, which overhangs the upper edge of the rotary bowl.

13 denotes the water-inlet pipe, the discharge or jet end of which is adapted to direct the water against the bowl to rotate the same. In practice it has been found that unless much pains are taken and the valve 14 of the inlet-pipe be constantly regulated the speed of the bowl will increase to such an extent as to throw the water by centrifugal force from said bowl, even though the shield 12 be employed. When a shield is employed and is connected to an outer bowl instead of to arms or an open-work frame, part of the overflowing water will, it is admitted, be collected by the shield and conducted to the outer bowl and from thence led to the discharge-pipe; but, on the other hand, some of the water is apt to and does splash over the shield and fall upon the floor of the room. To overcome this objection and to provide a rotary cuspidor in which the employment of the outer bowl will be rendered unnecessary is, as previously stated, the principal object of the invention. To this end I provide an automatic governor and would have it distinctly understood that while I have shown the preferred embodiment of my governor and will shortly proceed to describe its construction I reserve to myself the right and consider as falling within the scope of my invention to employ any form of an automatically-operated governor in connection with a rotary bowl for the purpose of regulating its speed of rotation. As shown in the present instance, the governor consists of a wing or spoon 15, provided with an arm 16, which is suitably pivoted to a stationary part of the framework of the cuspidor, preferably, but not necessarily, to the shield 12, so as to have an upward swinging movement. The arm is provided at its free end with a brake 17, preferably in the form of a rubber plug, which is clasped or otherwise secured to the end of the arm and projects under the inwardly-projecting flange 11 of the bowl and is adapted to come in contact therewith.

In operation, assuming the valve 14 to be turned to permit the water to discharge in the form of a jet through the pipe 13, the jet of water striking the bowl rotates it, and as the speed of the bowl increases the water is thrown by centrifugal force outwardly and due to the curved surface of the bowl upwardly, and as it moves with the bowl it comes into contact with the wing or spoon 15 of the governor and elevates it and raises the brake 17 into engagement with the inwardly-projecting flange 11 of the bowl and checks its movement. It will be understood that as the spoon projects downwardly a considerable distance below the upper edge of the bowl the water actuates the spoon before it reaches a point in the height of the bowl where it could possibly discharge, thus preventing its being thrown from the bowl.

From the foregoing description, taken in connection with the accompanying drawings, the construction, operation, and advantages of my improved fountain-cuspidor will be readily apparent without requiring an extended explanation.

It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus fully described my invention, what I claim as new, and desire to secure by Letters Patent of the United States, is—

1. In a cuspidor, a rotary bowl adapted and arranged for continuous rotation in combination with a movable governor for regulating the speed of rotation by contacting with said bowl, substantially as set forth.

2. In a cuspidor, the combination with a rotary bowl adapted and arranged for rotation, of means for discharging a jet of water within the bowl against the same for rotating it, of a movable governor actuated by the water-discharge within the bowl for regulating the movement of the bowl by contacting with said bowl, substantially as set forth.

3. In a cuspidor, the combination with the rotary bowl adapted and arranged for rotation, of means for discharging a jet of water within the bowl against the same for rotating it, of a governor actuated by the water-discharge within the bowl for regulating the movement of the bowl, said governor comprising in its construction a movable spoon arranged within the path of movement of the bodily-movable water within the bowl and having a brake adapted to engage the bowl and check or regulate its rotary movement, substantially as set forth.

4. In a cuspidor, the combination with a bowl-supporting frame, of a bowl adapted and arranged for continuous rotation in said frame, a jet-pipe for directing a jet of water against the interior surface of said bowl to rotate the same, a lever pivoted to said frame, a spoon or wing carried by said lever and projecting into the path of movement of the bodily-movable water within said bowl, and a brake actuated by said spoon and adapted to engage said bowl and regulate its movement, substantially as set forth.

In testimony whereof I have hereunto set my hand in presence of two subscribing witnesses.

GEORGE B. HAYCOCK.

Witnesses:
S. A. KEITE,
S. A. C. LOYD.